United States Patent [19]

Chateau

[11] 4,133,182
[45] Jan. 9, 1979

[54] APPARATUS AND METHOD OF CONNECTING A FLOWLINE TO A SUBSEA STATION

[75] Inventor: Georges M. Chateau, Pau, France

[73] Assignee: Societe Nationale Elf Aquitaine (Production), France

[21] Appl. No.: 759,030

[22] Filed: Jan. 13, 1977

[51] Int. Cl.$^2$ .............................................. F16L 1/04
[52] U.S. Cl. ................................. 405/169; 166/352; 285/24
[58] Field of Search .................. 61/107, 110; 166/0.5, 166/0.6; 285/24, 27

[56] References Cited

U.S. PATENT DOCUMENTS

| | | | |
|---|---|---|---|
| 3,459,442 | 8/1969 | De Yarmett et al. ............... | 285/27 |
| 3,604,731 | 9/1971 | Petersen ............................ | 166/0.6 X |
| 3,701,261 | 10/1972 | Nolan ................................ | 166/0.6 X |
| 3,775,986 | 12/1973 | Daughtry .......................... | 61/110 |
| 3,846,992 | 11/1974 | Liautaud ........................... | 166/0.6 X |

Primary Examiner—Mervin Stein
Assistant Examiner—David H. Corbin
Attorney, Agent, or Firm—Poms, Smith, Lande & Glenny

[57] ABSTRACT

An apparatus and method of connecting a flowline to a subsea station in which such a connection may be remotely controlled and the method employed is independent of water depth. A flowline connector apparatus which includes a receptacle connector supported by a subsea station and has its axis directed toward the approach of the flowline, an elongated connector mandrel on a proximate end of the flowline, a pulling means releasably connected to the subsea station adjacent the connector receptacle, and lock means on the receptacle for interlocking engagement with the mandrel to retain the mandrel in selected longitudinal position relative to the receptacle and with a connector end of the mandrel exposed inboardly thereof. A method of securing a flowline to a subsea station.

7 Claims, 9 Drawing Figures

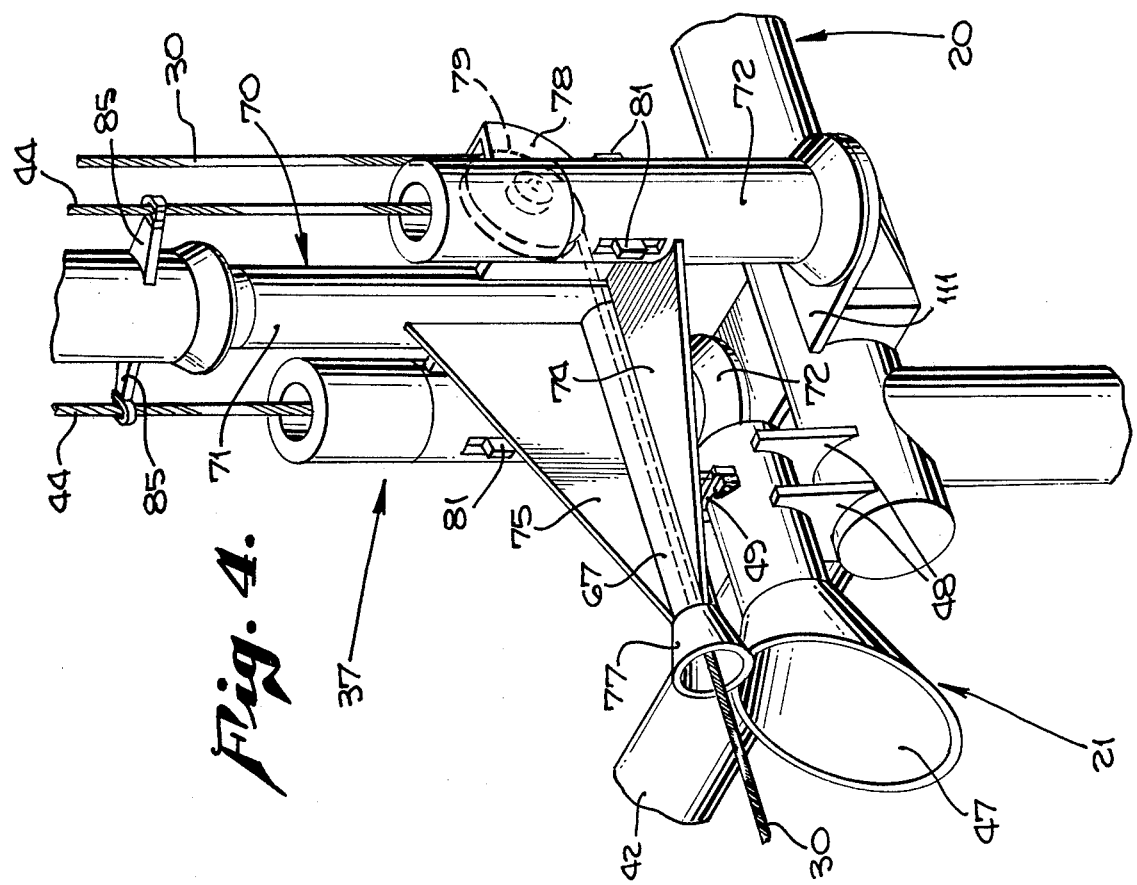
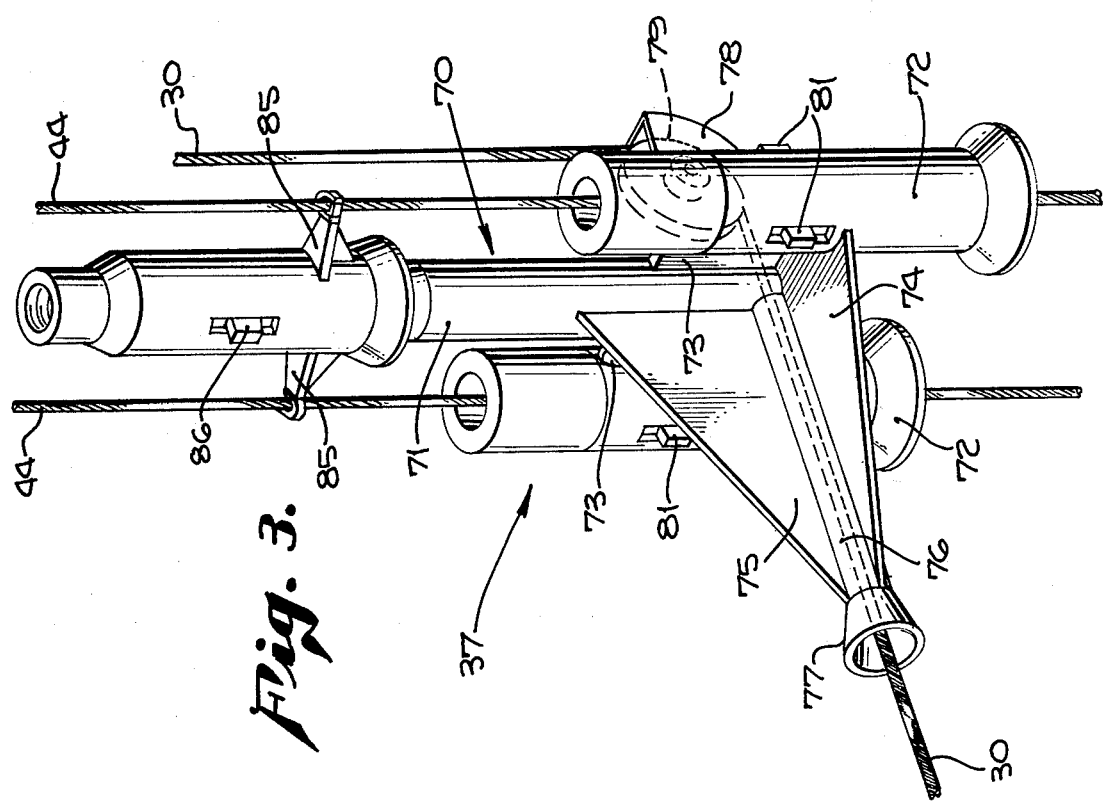

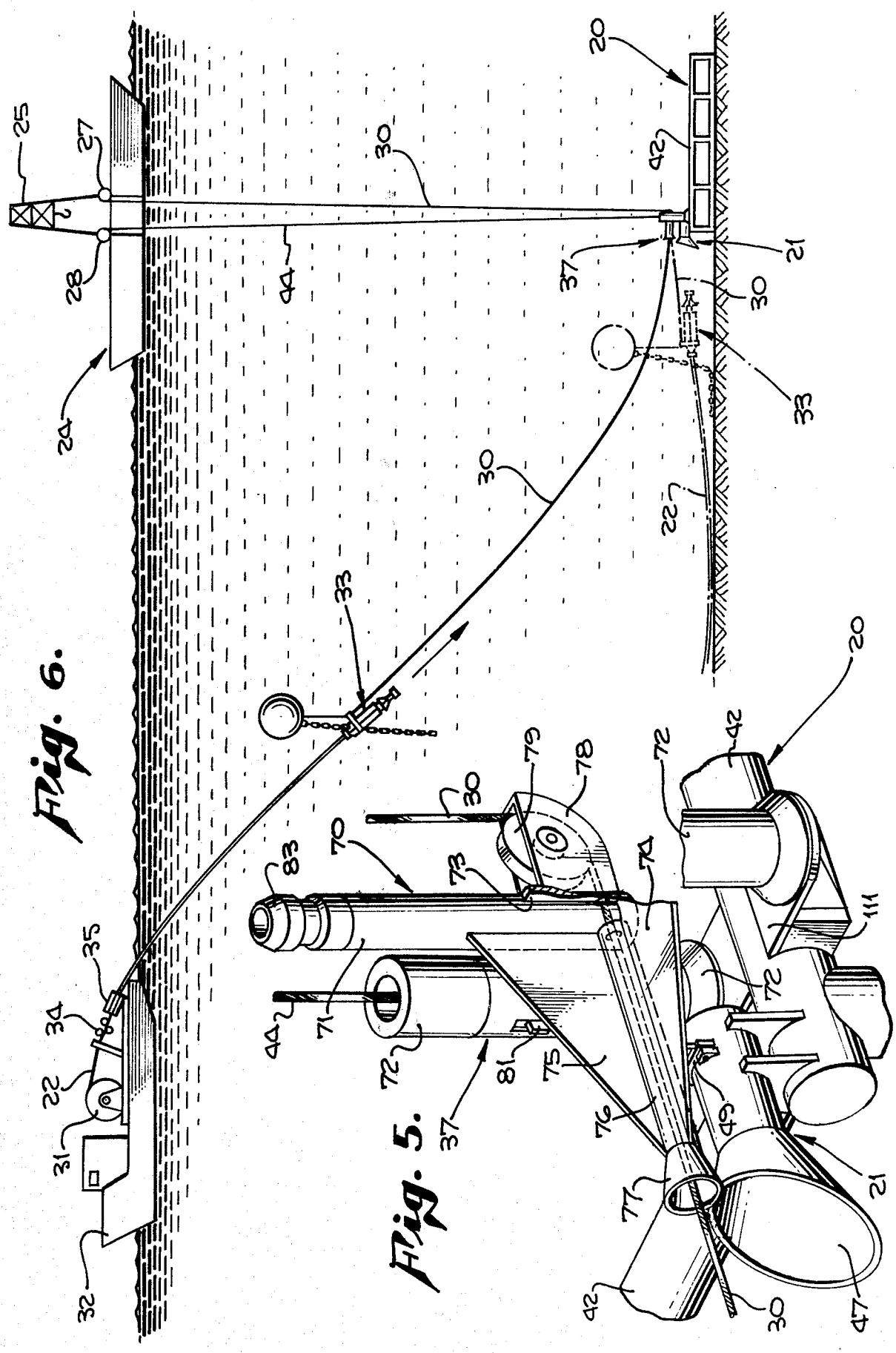

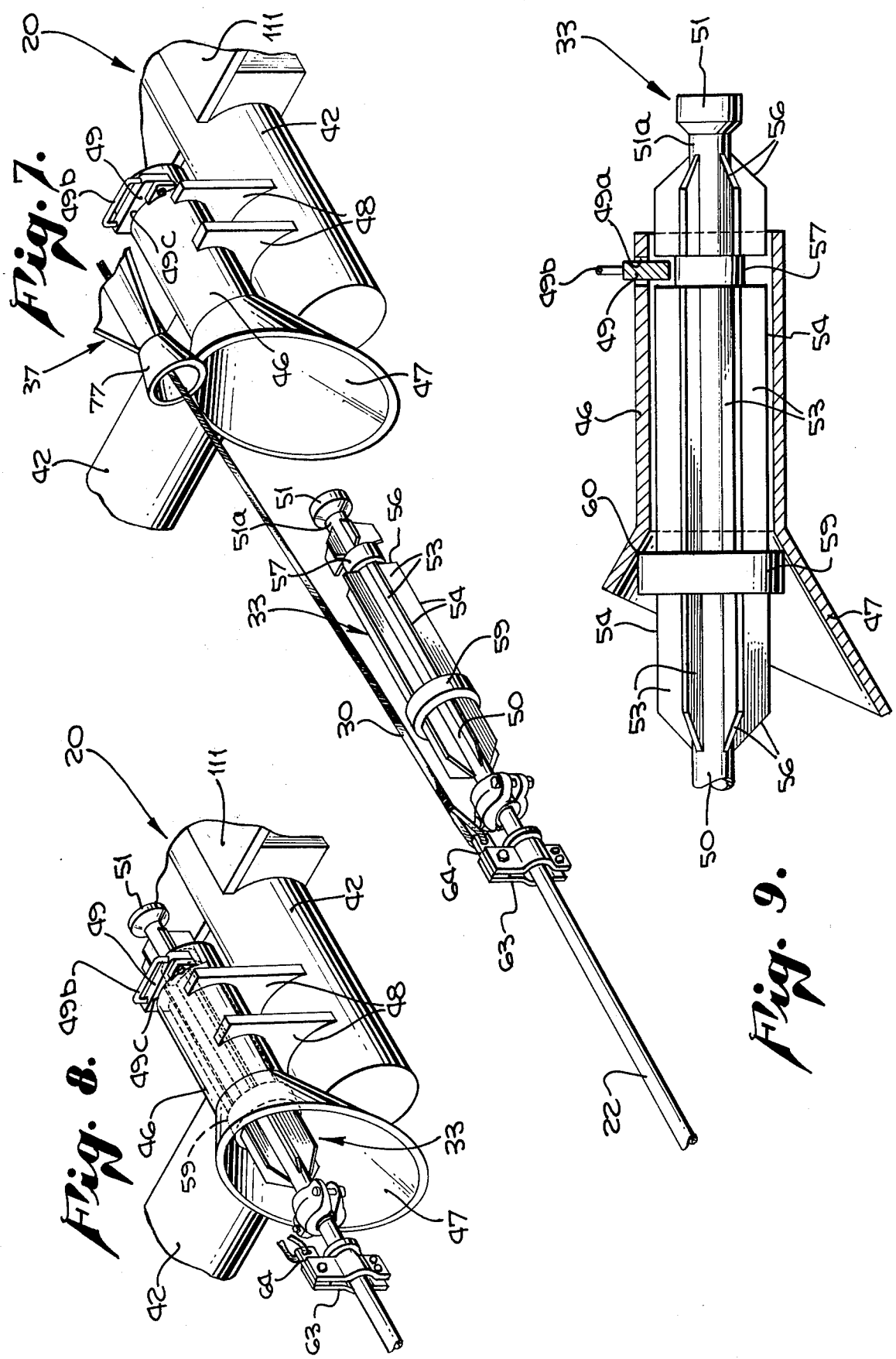

APPARATUS AND METHOD OF CONNECTING A FLOWLINE TO A SUBSEA STATION

BACKGROUND OF INVENTION

Deep sea well operations often include the establishment of a subsea station on the sea floor which may serve as a collecting or assembly point for a plurality of subsea flowlines which connect the subsea installation to remote subsea well heads and also to other locations for distribution of the production fluid. In many prior proposed installations, the connection of flowlines to the subsea station was at water depths which permitted the use of divers. Such prior proposed systems were thereby limited to water depths at which divers could operate.

In still other prior proposed systems, a submarine or diving bell equipped with robot mechanical devices was used for making connections between various well equipment and between a flowline and a subsea installation. Such use of submarines and subsea robots to provide connections at great water depths was time consuming and often difficult to accomplish.

SUMMARY OF INVENTION

The present invention relates to a means and method for connecting a flowline to a subsea station by an apparatus remotely controlled and in which the assistance of divers is not required.

A primary object of the present invention is to provide an apparatus for making a connection of one end of the flowline to a receptacle means on a subsea station and wherein the connection is made under remote control and at any water depth.

An object of the invention is to provide a means for connecting a flowline to a subsea station wherein the leading end of the flowline is equipped with mandrel means adapted for interlocking engagement with a receptacle means on the subsea station.

Another object of the invention is to provide a novel method of connecting a flowline to a subsea station in which the presence of divers or submarine vessels is not required and in which the method is remotely controlled.

Another object of the invention is to provide a novel cable pulling means adapted to be attached to a subsea station.

A further object of the invention is to provide a novel receptacle means on a subsea station for receiving and longitudinally retaining a mandrel means on the end of a flowline to permit the mandrel means to be engaged by a connector means on the subsea station.

A still further object of the present invention is to disclose and provide a latch means on a receptacle means on a subsea station adapted to be actuated by a mandrel means on the end of a flowline for interlocking engagement with the mandrel means.

Various objects and advantages of the present invention will be readily apparent from the following description of the drawings in an exemplary embodiment of the invention is shown.

IN THE DRAWINGS

FIG. 3 is a perspective view of a removable pulling means being lowered on guide lines to the receptacle means on the subsea station.

FIG. 4 is a perspective view showing the connection of the pulling means to the subsea station at the receptacle means.

FIG. 5 is a perspective view similar to FIG. 4 showing the receptacle means, and pulling means at the subsea station and with the lowering pipe string disconnected therefrom.

FIG. 6 is a schematic view of the mandrel being lowered from the pipe laying vessel with the pulling line attached to the mandrel, fed through the pulling means, and attached to winch drums on the vessel above the subsea station; the view also showing in phantom lines the flowline on the sea floor and being pulled toward the subsea station.

FIG. 7 is a fragmentary, perspective view illustrating in more detail the approach of the mandrel to the receptacle means on the subsea station.

FIG. 8 is a perspective view showing the mandrel and receptacle means in interlocked, latched relation.

FIG. 9 is a longitudinal sectional view taken in the plane indicated by line IX — IX of FIG. 8 showing the assembled and latched mandrel and receptacle means.

Figure 1:
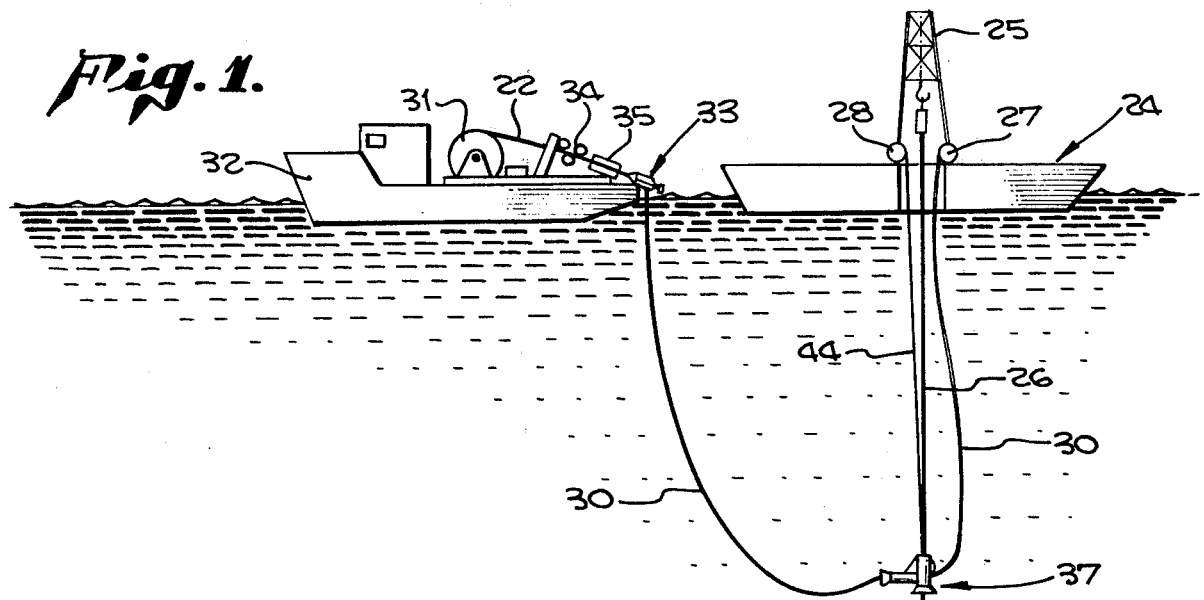
FIG. 1 is a schematic view of a subsea station, a vessel above said station, and a pipe laying vessel carrying a flowline to be connected to the subsea station, and embodying the apparatus and method of this invention.

In the schematic view shown in FIG. 1 illustrating the apparatus and method of this invention, a subsea station 20 is located on the sea floor and may include subsea modules or assemblies for wellhead, production and control operations for a plurality of subsea wells. The wellhead production and control modules are not shown, the subsea station may be of the type shown and described in copending application Ser. No. 763,110 owned by a common assignee. Such a subsea station may serve as a collection point for a plurality of remote subsea wells for transferring production fluid from flowlines on the sea floor to a support vessel thereabove for processing or other disposition. Subsea station 20 is therefore provided with a flowline connector receptacle means 21 for connection to a flowline 22.

Above subsea station 20, a pipe connecting boat or vessel 24 may be equipped with a derrick 25 for raising and lowering a drill pipe string 26 used in the method of making a flowline connection of this invention. Vessel 24 also is equipped with power winches 27 and 28, winch 27 having a pulling cable or line 30 adapted to be connected to flowline 22, which may be carried on a pipe spool or reel 31 provided on pipe laying vessel 32. Flowline 22 carries at its leading end a mandrel 33. Flowline 22 is fed through a flowline pipe straightening means 34 and through brake friction means 35 when flowline 22 is pulled off reel 31.

Also, as shown in FIG. 1, drill pipe string 26 supports and lowers a pulling means or assembly 37 to the subsea station 20 for connection thereto for pulling mandrel 33 into engagement with the receptacle means on the subsea station as described later in detail.

Subsea station 20 is provided, at a suitable location on its frame structure, with spaced, upstanding guide posts 40 rigidly and fixedly supported on brackets 41 to a frame member 42 of the subsea station. Each guide post 40 has an upper end connector means 43 to which a guide line 44 may be attached by suitable remote controlled means such as the Matra guide line attachment means or other suitable well-known guide line attachment means. The method of attaching a guide line to the guide post is not part of this invention.

Figure 2:
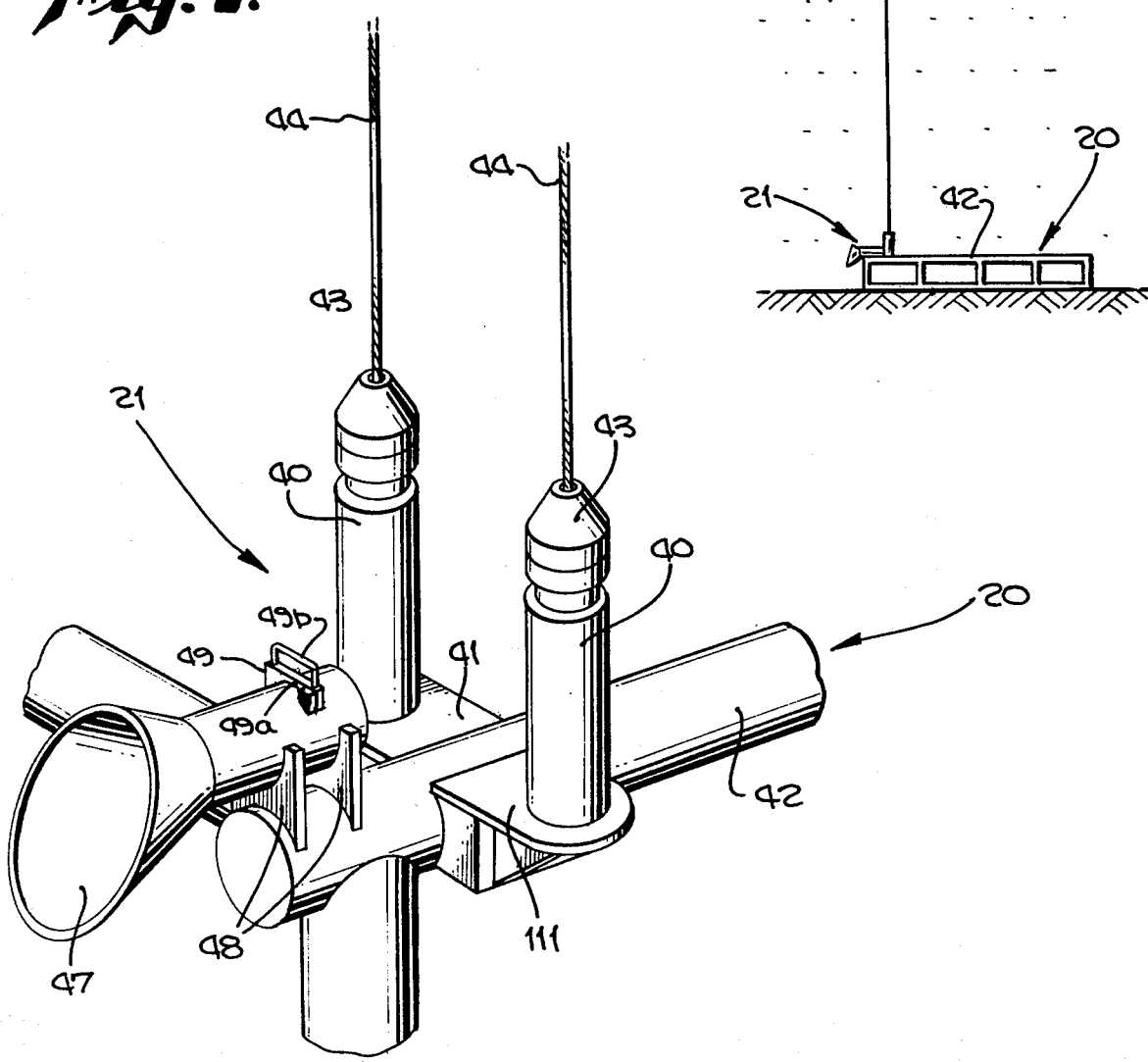
FIG. 2 is an enlarged, fragmentary perspective view of a portion of the subsea station having the flowline connector means of this invention.

Receptacle means 21, FIG. 2, may comprise an elongated hollow cylindrical body 46 having an outwardly flared mouth 47 to facilitate guiding of mandrel 33 into member 46. Cylindrical member 46 may be seated on spaced saddles 48, the saddles 48 being welded to the cylindrical member 46 and to frame member 42. Cylindrical member 46 is secured so that its axis, when projected, passes between guide posts 40 and lies in the direction of approach of the mandrel 33.

Transversely disposed with respect to the axis of body member 46 is a movable, in this example pivoted, latch member 49 positionable in a transverse slot 49a formed in the upper partcylindrical portion of body member 46 above inboard saddle 48. Latch member 49 may be gravity actuated and in down latched (FIG. 9) position, has a lower portion projecting into the hollow member46 and into and across the path of mandrel 33 to limit and restrict relative axial movement of the mandrel as later described. Latch member 49 may be gravity actuated as in this example or biased downwardly in slot 49a by suitable spring means associated with pivotal mounting for the latch means. Latch member 49 also includes a bail-type latch handle 49b extending across its top to allow grasping thereof by a remotely controlled manipulator for lifting the latch member out of engagement with the mandrel 33 should it be necessary to replace the line.

Mandrel 33 is best seen in FIGS. 7, 8 and 9 and may comprise an elongated, tubular member 50 provided at one end with an enlarged head 51 cooperable with a laterally engageable flowline connector means as described and shown in copending application Ser. No. 763,110 owned by a common assignee. The opposite end of tubular member 50 is connected to flowline 22 by a suitable coupling 52. Extending along tubular member 50 of mandrel 33 are a plurality of longitudinally extending radially disposed guide ribs or flutes 53, the edges 54 of which lie on a cylindrical surface having a diameter slightly less than the inner diameter of the cylindrical body member 46 of the receptacle means to provide sliding coaxial relationship of the mandrel within the receptacle during assembly. Radial ribs 53 are provided with tapered end edges 56, the end edges 56 spaced inwardly from head 51 serving as a cam means as later described. Spaced at a selected distance from head 51, the guide ribs 53 are interrupted to provide an annular locking recess 57 for latch member 49 carried on body member 46.

Adjacent the other end of radial ribs 53, mandrel 33 is provided with a stop collar 59 having an outer diameter greater than the inner diameter of cylindrical member 46 and serving to abut as at 60 internal surfaces of mouth 47 so as to positively limit longitudinal movement of mandrel 33 within body member 46 to position locking recess 57 opposite latch member 49.

Behind coupling 52, flowline 22 may be provided with a clamp means 63 having a forwardly extending eye 64 for connection to one end of pulling line 30. Clamp means 63 is loosely mounted on flowline 22 with respect to rotation thereabout and is connected to a preselected buoy and chain to hold clamp means 63 upright and the flowline at a selected height above the sea floor which corresponds to the axis of the body member 46.

Means for pulling mandrel 33 into receptacle means 21 comprises a pulling assembly or means 37 best viewed in FIG. 3. Pulling means 37 may comprise a guide frame generally indicated at 70. Frame 70 may include an upstanding cylindrical pipe member 71 located between laterally spaced guide tubes 72 and connected thereto by vertical plates 73 and forwardly extending triangularly shaped horizontal gusset plates 74 and a vertical gusset plate 75. A forwardly extending guide tube 76 with a guide funnel 77 for pulling line 30 is secured as by welding to longitudinal, parallel edges of triangular plates 74 and 75. Rearwardly of pipe member 71, a 90° segment housing 78 is secured to the lower portion of member 71 and supports a sheave or pulley 79 having its groove in alignment with the axis of tube 76. Housing 78 protects the sheave and also prevents pulling cable 30 from disengagement with sheave 79.

Each guide tube 72 is provided with remotely actuated lock dog means 81 for locking engagement with guide posts 40 to detachably secure guide frame 70 to the guide posts 40 and to the frame of the subsea station.

Pipe member 71 includes a mandrel end 83 for connection to a pipe connector means 84 having laterally extending arms 85 for slidable connection with guide lines 44. Connector means 84 is provided with releasable latch dogs 86 for releasable connection with the pipe member 71. Connector means 84 also provides a connection to a drill string, such as drill string 26, for lowering the pulling means 37 to the subsea installation for cooperable reception of the guide posts 40.

If desired, the drill string may be raised during operation of the pulling assembly as now described.

Referring to FIG. 1, vessel 24 is positioned over subsea station 20 and provides derrick 25 for lowering drill string 26 to which is attached pulling means 37. Before pulling means 37 is lowered into the sea and while it is available on the deck of vessel 24, pulling cable 30 is fed from winch means 37, reaved through pulley 79 and passed through tube 76, and then transferred by suitable means to the pipe laying vessel 32 for connection to mandrel 33. The connection to mandrel 33 may be at the eyelet 64, as previously described.

After the pulling line 30 has been connected to the mandrel 33, the pulling means 37 may be lowered to the subsea station 20 by drill pipe 26 and during such lowering of pulling means 37, the pulling line 30 is further paid out from the winch means 27 so that the mandrel 33 is not pulled from the pipe laying vessel 32.

Pulling means 37 is guided by guide lines 44 into locked assembly with guide posts 40. In such releasably locked position, tube 76 of the pulling means 37 extends over body member 46 with its axis parallel thereto and with guide funnel 77 positioned above the guide mouth 47.

As shown in FIG. 6, after drill string 26 has been retrieved, the pipe laying vessel 32 moves or lays away from vessel 24. Winch means 27 is locked against rotation and as the vessel 32 moves away on the predetermined course for laying flowline 22, flowline 22, which is spooled upon reel 31, is pulled from reel 31, passed through pipe straighteners 34 for unbending and straightening the flowline 22.

After a preselected length of flowline has been unspooled and a desired length rests upon the sea floor, winch means 27 is unlocked and actuated to take up pulling line 30 and thus move the flowline toward the subsea station 20 and toward the receptacle means 21. As the mandrel 33 approaches the receptacle means 21, the mandrel is drawn into alignment with the body member 46 and the leading end of mandrel 33 is drawn into the guide funnel and into the hollow body member 46. As the leading end of mandrel 33 passes through the hollow body member 46, the tapered rib edges 56 engage latch member 49 and cam the latch member upwardly in slot 49a. For a short distance, the latch member 49 is held in up position by the parallel edges of the guide ribs 53 until locking recess 57 passes beneath the latch member 49 and the latch member falls by gravity into the recess.

Stop collar 59 carried by mandrel 33, at this relative position of the mandrel 33 and body member 46, is brought into abutting engagement with interior surfaces of mouth 47 and prevents longitudinal overtravel of mandrel 33 in the receptacle body member 46 so that latch member 49 is positioned opposite locking recess 57 for interlocking engagement therewith.

The flowline 22, with its mandrel 33, is thus received and retained in receptacle body member 46 against relative longitudinal movement with respect thereto. Head 51 of mandrel 33 projects beyond the inboard end of receptacle body member 46, FIG. 9, and presents a reduced neck portion 51a which is adapted to be laterally engaged by the laterally engageable connector means shown and described in copending application Serial No.

After the mandrel 33 is locked within the receptacle means 21, drill string 26 may be reconnected to the pulling means 37. Drill string 26 and its connection to mandrel 83 of pipe member 71 provides pressure actuating fluid for actuating a cable cutting means, not shown, on the pulling means 37 for cutting the cable forwardly of sheave 79. After the pulling line 30 has been so cut, the pressure actuating fluid may also be used for actuating the release mechanisms of the pulling means 37 so that the locks securing the pulling means 37 to the guide posts 40 may be actuated to release position for freeing pulling means 37 from guide posts 44. The drill string 26 may now be retrieved, together with the pulling means 37.

The hydraulic lines for actuating the cable cutting means and the release mechanisms are not shown in this example because the attachment and use of such hydraulic fluid pressure lines is well-known.

Various modification and changes may be made in the apparatus and method described above which come within the spirit of the invention and all such changes and modifications coming within the scope of the appended claims are embraced thereby.

I claim:

1. A flowline connector means for a pipe at a subsea station for a flowline laid on the sea floor; comprising:
   an elongated connector receptacle supported by the subsea station and having its axis directed toward the approach of the flowline;
   an elongated connector mandrel on a proximate end of the flowline;
   pulling means including a cable having a connection to said flowline behind said mandrel,
   said pulling means being positionable above and adjacent said receptacle for pulling said mandrel along a path coincident with the axis of the receptacle and toward and into said receptacle,
   said pulling means including a cable guide member having a guide path parallel to and above said receptacle;
   and means on said receptacle cooperable with means on said mandrel for locking said mandrel in a selected longitudinal position relative to the receptacle with a mandrel end projecting beyond said receptacle for connection in said position to a pipe on said subsea station.

2. A connector means as stated in claim 1 wherein said means on said receptacle for locking said mandrel includes a movable latch member extending into the path of said mandrel;
   tapered means on the mandrel engageable with said latch member for lifting said latch member out of the path of said mandrel; said means on said mandrel for locking said mandrel in longitudinal position including
   a latch member receiving recess on the mandrel inwardly of said tapered means;
   said latch member dropping into said recess for locking engagement with said mandrel.

3. A connector means as stated in claim 2 wherein said mandrel includes
   longitudinally extending guide fins,
   said guide fins having inclined end portions at the leading end of said mandrel for camming said latch member into position for latching engagement with said latch receiving recess.

4. A connector means as stated in claim 2 wherein said means on said mandrel for locking the mandrel in selected longitudinal position includes
   a stop member on said mandrel spaced from said latch member receiving recess and engageable with the entry end of said receptacle to limit relative movement of the mandrel into said receptacle.

5. A connector means as stated in claim 4 wherein said stop member includes an annular collar encircling the mandrel;
   said receptacle means including an outwardly flaring entry end portion;
   said collar being engageable with internal surfaces of said outwardly flared entry end portion of said mandrel to limit relative axial movement of said mandrel and receptacle and for positioning said locking means.

6. A flowline connector means for a pipe at a subsea station for a flowline laid on the sea floor; comprising:
   an elongated connector receptacle supported by the subsea station and having its axis directed toward the approach of the flowline;
   an elongated connector mandrel on a proximate end of the flowline;
   means including a pulling line positionable at the subsea station adjacent the receptacle for pulling said mandrel toward and into said receptacle;
   spaced guide posts on said subsea station adjacent said receptacle;
   said pulling means including a guide frame removably attachable to said guide posts;
   a guide tube on said guide frame for said pulling line located above and parallel to said receptacle when said guide frame is attached to said guide posts;
   a sheave on said guide frame;
   said pulling line being connected to said mandrel, passing through said guide tube and over said sheave means, and extending to a remote means for pulling said line;
   said pulling means having an axis parallel to said receptacle means when at the said subsea station;
   and means on said receptacle cooperable with means on said mandrel for locking said mandrel in a selected longitudinal position relative to the receptacle with a mandrel end projecting beyond said receptacle for connection in said position to a pipe on said subsea station.

7. A connector means as stated in claim 6 including means on said guide frame for cutting said pulling line for releasing said pulling line from said mandrel after said mandrel is in latched engagement with said receptacle.

* * * * *

UNITED STATES PATENT AND TRADEMARK OFFICE
CERTIFICATE OF CORRECTION

PATENT NO. : 4,133,182
DATED : January 9, 1979
INVENTOR(S) : Georges M. Chateau

It is certified that error appears in the above-identified patent and that said Letters Patent are hereby corrected as shown below:

Column 2, line 36, "763,110" should read -- 743,586 --.

Column 4, line 36, "37" should read -- 27 --.

Column 5, line 25, after "Serial No." insert -- 743,586 --.

Signed and Sealed this

Thirteenth Day of November 1979

[SEAL]

Attest:

RUTH C. MASON
Attesting Officer

LUTRELLE F. PARKER
Acting Commissioner of Patents and Trademarks